United States Patent [19]
Hervin et al.

[11] Patent Number: 5,805,879
[45] Date of Patent: Sep. 8, 1998

[54] IN A PIPELINED PROCESSOR, SETTING A SEGMENT ACCESS INDICATOR DURING EXECUTION STAGE USING EXCEPTION HANDLING

[75] Inventors: Mark W. Hervin, Dallas, Tex.; Raul A. Garibay, Jr., Los Altos, Calif.

[73] Assignee: Cyrix Corporation, Richardson, Tex.

[21] Appl. No.: 604,788

[22] Filed: Feb. 23, 1996

[51] Int. Cl.[6] .................................. G06F 9/34; G06F 9/38
[52] U.S. Cl. ............................................. 395/591; 395/568
[58] Field of Search ..................... 395/591, 395, 395/568, 569, 570, 586, 800, 418, 419

[56] References Cited

U.S. PATENT DOCUMENTS

| | | | |
|---|---|---|---|
| 5,144,551 | 9/1992 | Cepulis | 395/490 |
| 5,255,379 | 10/1993 | Melo | 395/412 |
| 5,517,651 | 5/1996 | Huck et al. | 395/570 |
| 5,537,559 | 7/1996 | Kane et al. | 395/591 |
| 5,596,755 | 1/1997 | Pletcher et al. | 395/734 |

*Primary Examiner*—Parshotam S. Lall
*Assistant Examiner*—Viet Vu
*Attorney, Agent, or Firm*—Andrew S. Viger; John L. Maxin

[57] ABSTRACT

In a pipelined processor having at least one execution pipeline for executing instructions, the execution pipeline including ID (decode), AC (address calculation), and EX (execution) processing stages, the processor capable of addressing segments of system memory coupled thereto, a circuit for, and method of, setting a segment access indicator associated with a segment of the system memory being accessed by the processor. The circuit includes: (a) exception generating circuitry to generate an exception when the segment access indicator requires setting and (b) exception handling circuitry, invoked by the processor in response to generation of the exception, to flush the execution pipeline of instructions following a segment load instruction, set the segment access indicator and load an address pointer of the processor with an address corresponding to a specified location within the segment.

12 Claims, 5 Drawing Sheets

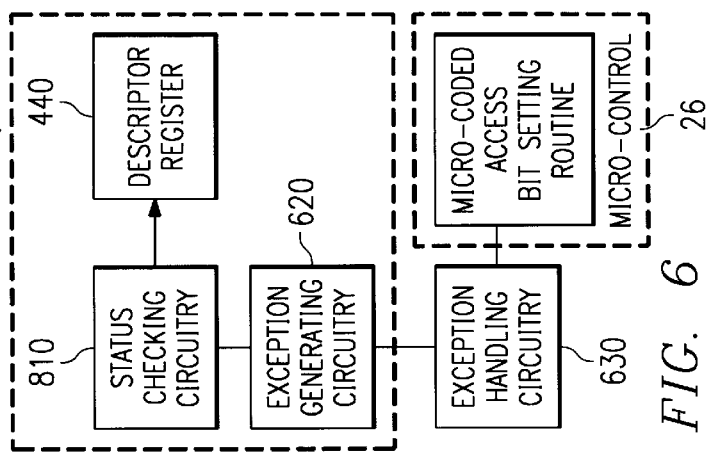

FIG. 6

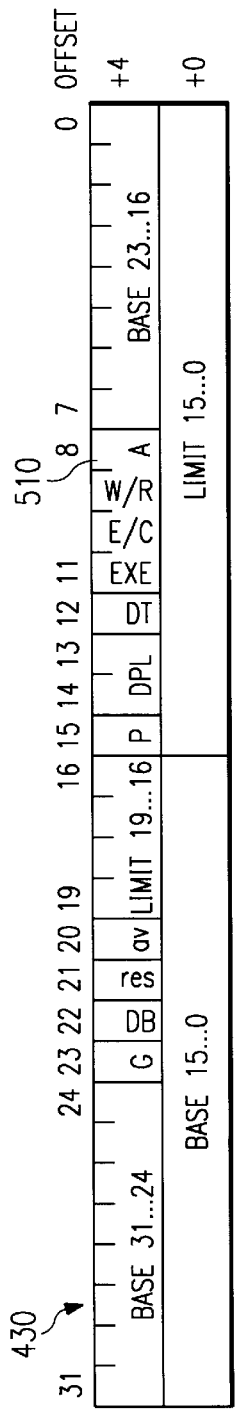

BASE 31...24, BASE 23...16, BASE 15...0: SEGMENT BASE
LIMIT 19...16, LIMIT 15...0: SEGMENT LIMIT
G: GRANULARITY
    0 = BYTE GRANULARITY   1 = PAGE GRANULARITY
DB: SEGMENT SIZE (DEFAULT/BIG)
    0 = 16-BIT OPERANDS/ADDRESSES (DEFAULT)   1 = 32-BIT OPERANDS/ADDRESSES (BIG)
res: RESERVED
av: AVAILABLE FOR OPERATING SYSTEM
P: SEGMENT PRESENT
    0 = SEGMENT NOT IN MEMORY   1 = SEGMENT IN MEMORY
DPL: DESCRIPTOR PRIVILEGE LEVEL
    00 = 0   01 = 1   10 = 2   11 = 3
DT: DESCRIPTOR TYPE
    0 = SYSTEM SEGMENT   1 = APPLICATION SEGMENT
TYPE: TYPE OF SYSTEM OR APPLICATION SEGMENT

FIG. 5

IN A PIPELINED PROCESSOR, SETTING A SEGMENT ACCESS INDICATOR DURING EXECUTION STAGE USING EXCEPTION HANDLING

CROSS-REFERENCE TO RELATED APPLICATION

The present Application is related to U.S. patent application Ser. No. 08/138,789, filed Oct. 18, 1993, entitled "Microprocessor Pipe Control and Register Translation," commonly assigned with the present invention and incorporated herein by reference, now abandoned.

TECHNICAL FIELD OF THE INVENTION

The present invention is directed, in general, to computing systems and, more specifically, to circuit and method for setting a segment access indicator in a computer system. The segment access indicator provides an indication of whether or not a segment has been accessed, allowing operating system software to determine whether the segment should be written to nonvolatile memory.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output "I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft WINDOWS™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, that calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline, the processing of one instruction completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

Memory management is one broad operation type that typically expends vast processor resources. More particularly, memory management refers to any one of a number of methods for storing and tracking data and programs in memory, as well as reclaiming previously occupied memory spaces that are no longer needed. The efficiency of a given memory management process, and in particular the efficiency of a processor in performing the same, is measured largely by processor utilization.

Of particular concern to the present invention is segmentation. "Segmentation" is a memory management process that divides memory into portions commonly referred to as "segments." x86-based processors support a number of different processing modes, among which are real and protected modes. Real mode is an operational state, available first in the 80286 processor and its successors, that enables the processor to function as an 8086/8088 processor. Real mode addressing is limited to one megabyte of memory. Protected mode, by comparison, is an operational state, available first in the 80286 processor and its successors, that allows the processor to address all available memory. Protected mode is directed to preventing errant programs from entering each other's memory, such as that of the operating system. Segmentation is available in both the real and protected modes. In the 80386 processor and its successors, protected mode also began to provide access to 32-bit instructions and sophisticated memory management modes, including paging.

In conventional x86-based protected mode, memory objects (i.e., collections of fields, records or the like of addressable information in memory) and descriptor tables (i.e., tables of eight-byte data blocks that describe various ones of the segments) are stored within ones of a plurality of segments. To access a particular memory object, the processor combines the base address of a particular descriptor table and a selector (i.e., an offset or index) to access a particular segment descriptor therein. The processor then uses the accessed retrieved segment descriptor as a base address of a particular segment associated with the particular memory object, combining the same with an offset into the segment to access the particular memory object.

U.S. patent application Ser. No. 08/606,150, titled "Circuit and Method For Addressing Segment Descriptor Tables", now U.S. Pat. No. 5,596,735 commonly assigned to the assignee of the present invention and filed concurrently herewith, and which is incorporated herein by reference for all purposes, discusses segment register loading in detail and introduces a circuit and method for quickly loading segment registers of a processor with data pertaining to a particular segment of memory to be addressed. The circuit and method address the foregoing deficiencies by predicting the location of a reference (found in the descriptor tables) to data. Once the segment registers are loaded, the appropriate segment descriptor may be loaded into descriptor registers within the processor actually to address the segment.

According to prior art x86-based architectures, typical execution of an instruction may initiate control sequences to facilitate certain operations in ones of the processing stages of the pipeline. One such operation sets a segment access indicator within the segment descriptor. More generally, whenever a segment in memory is first accessed, it has been conventional to set the segment access indicator associated therewith in one of the early processing stages. Setting of segment access indicators allows the identification of recently-accessed segments. This information is useful for a number of reasons, some of which are discussed in greater detail hereinbelow.

In more recent x86-based processors, however, segment registers and segment descriptors are loaded late in the pipeline, typically in the execution processing stage, to increase the processor's throughput. By the time status checking circuitry within the processor determines that the segment access indicator is required to be set, the execution processing stage has already relinquished control of the earlier instruction decode and address calculation processing stages that are typically employed to set the segment access indicator.

There accordingly exists a need in the art for systems and methods for improving memory management in x86-based processors and, more particularly, for marking segments of memory as having been accessed. More specifically, what is needed in the art is a way of setting status bits from the execution processing stage of a processor pipeline.

SUMMARY OF THE INVENTION

To address the above-discussed deficiencies of the prior art, it is a primary object of the present invention to provide a way to mark segments of memory as having been accessed.

In the attainment of the above primary object, the present invention provides, in a pipelined processor having at least one execution pipeline for executing instructions, the execution pipeline including ID (decode), AC (address calculation), and EX (execution) processing stages, the processor capable of addressing segments of system memory coupled thereto, a circuit for, and method of setting a segment access indicator associated with a segment of the system memory being accessed by the processor.

The circuit includes: (a) exception generating circuitry to generate an exception when the segment access indicator requires setting and (b) exception handling circuitry, invoked by the processor in response to generation of the exception, to flush the execution pipeline of instructions following a segment load instruction, set the segment access indicator and load an address pointer of the processor with an address corresponding to a specified location within the segment. The "specified location within the segment" maybe the instruction following the segment load instruction or may be another instruction, as appropriate. Regardless, the processor resumes execution of instructions.

The present invention introduces the idea of employing the processor's already-existing exception-handling system to achieve some of the steps necessary to set the segment access indicator. One of the necessary steps is to flush the pipeline of instructions behind the instruction being executed in the EX processing stage. The processor's existing exception-handling system does this automatically upon receiving an exception and before invoking more specific circuitry (advantageously embodied as a sequence of microcode instructions) to handle the exception. The present invention further provides the more specific circuitry to set the segment access indicator and load the address pointer for resuming normal processing.

In one embodiment of the present invention, the circuit further comprises status checking circuitry that examines a segment descriptor containing the segment access indicator for a status of bits in the segment descriptor. The status checking circuitry generates the exception when the segment access indicator is in a zero state. As will be described more particularly, the process of gaining access to a different segment begins with a segment descriptor pertaining to the different segment being loaded into special registers within the processor. After the segment descriptor is retrieved from memory, the status checking circuitry examines status bits within the segment descriptor, the status bits indicating various statuses with respect to the segment. The segment access indicator, one of the status bits, indicates whether the segment described by the segment descriptor has, or has not, been accessed. Operating systems that swap segments between volatile and nonvolatile memory use the segment access indicators of the segments to determine when accessed segments should be written to nonvolatile memory to preserve their contents.

In one embodiment of the present invention, the processor reloads instructions following the segment load instruction into at least the ID and AC stages as a function of the specified location. Preferably, once the address pointer is loaded, execution of instructions resumes. Accordingly, instructions are fetched from system memory as a function of the specified location (the value of the address pointer).

In one embodiment of the present invention, the exception handling circuitry is embodied in a sequence of microcode instructions. Those of ordinary skill in the art will recognize, however, that the present invention may be embodied in hardware or higher-level software instructions.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 5 illustrates a block diagram of the descriptor register discussed in FIG. 4 containing an exemplary segment descriptor having a segment access indicator in accordance with an x86 architecture;

FIG. 6 illustrates a block diagram of an exemplary circuit for setting a segment access indicator in the exemplary processor of FIGS. 1a, 1b, 2 and 3.

DETAILED DESCRIPTION

Figure 1A:
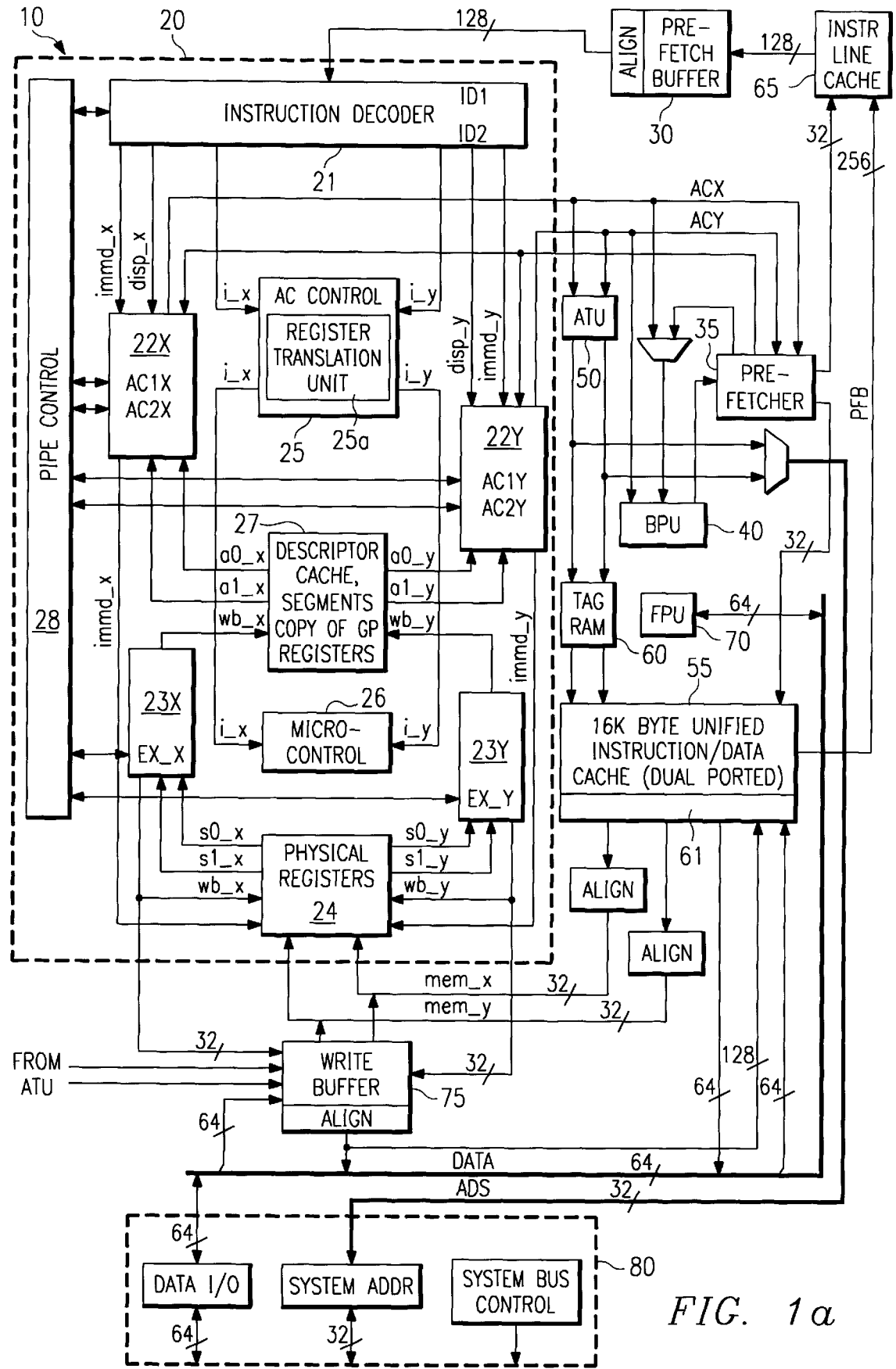
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75, and a bus interface unit ("BIU") 80. Each of the above-identified components is conventional, i.e., their functionality is known. The functionality associated with the interrelationship of various ones of the components is also known. Exemplary processors implementing the foregoing are the M-1 and M-6 processors available from Cyrix Corp. of Richardson, Tex.

In an exemplary embodiment, instruction line cache 65 and unified cache 55 respectively operate as primary and secondary instruction caches, each having a 32 byte line size. This implementation suitably reduces instruction fetches to unified cache 55. In a preferred embodiment, instruction line cache 65 may suitably be a 256 byte cache, while unified cache 55 may suitably be a 16 kilobyte ("Kbyte") code/data cache. Unified cache 55 may also suitably be associated with TAG RAM 60. In another exemplary embodiment, processor 10 may suitably use a 32-bit address bus ("ADB"), a 64-bit data bus ("DBS") and a 256 bit pre-fetch bus ("PFB"). The PFB corresponds to the 32 byte line sizes of unified cache 55 and instruction line cache 65, and suitably enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation/operand access ("AC") stages, 22X and 22Y, two execution ("EX") stages, 23X and 23Y, and a register file 24 having 31 32-bit registers. Core 20 further includes an AC control stage 25, a microcontrol unit 26, a second register file 27 containing a descriptor cache, segment registers and a copy of the logical general purpose registers, and a pipe control unit 28.

Exemplary ID stage 21 is operative to decode a variable length x86-based instruction set, and may suitably retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 suitably includes 31 physical registers. Exemplary AC control stage 25, that includes a register translation unit 25a, and may further suitably include appropriately arranged register renaming hardware (not shown), is operative to control address calculations. Exemplary microcontrol unit 26, that may suitably include a micro-sequencer (not shown) and a micro-ROM (not shown), provides execution control. Again, exemplary second register file 27 may suitably include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may suitably use the excess mapping capacity by allowing register translation unit 25a to map to a physical register located other than register file 24. In the illustrated embodiment, the physical register may suitably be located in second register file 27, that is under control of AC control unit 25. In an alternate exemplary embodiment, pipe control unit 28 is further operative to remove bubbles from the instruction stream, i.e., "flushing", the execution pipelines behind branches that are mis-predicted and handling the execution of exception-causing instructions.

More particularly, BPU 40 suitably monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., general purpose registers, the instruction pointer and the condition code register) that may suitably be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may suitably be queued into write buffer 75. Write buffers 75 provide an interface for writes to unified cache 55, while non-cacheable writes proceed directly from write buffers 75 to an external memory (shown and described in conjunction with FIG. 2). Write buffer logic may suitably support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffers 75 (i.e., write buffer 75 is preferably allocated for each floating point store operation).

Figure 1B:
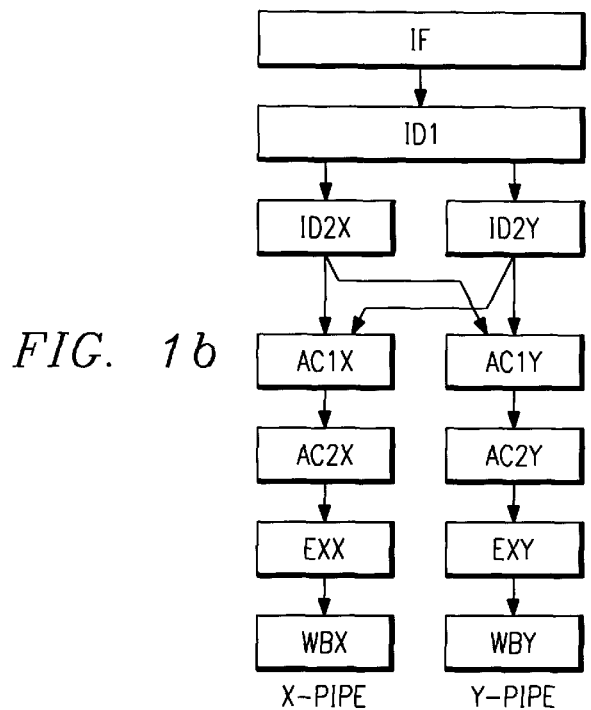
FIG. 1b illustrates a block diagram of an exemplary seven pipelined stage processor, including X and Y execution pipelines.

Turning to FIG. 1b, illustrated is a more detailed block diagram of seven exemplary pipelined stages of processor 10 of FIG. 1a, including X and Y execution pipelines. As before, each of the X and Y execution pipelines includes IF, ID1, ID2, AC1, AC2, EX and WB stages. The discussion of FIG. 1b is undertaken with reference to FIG. 1b.

Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 that subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is suitably determined during the ID stages, causing the instruction to be issued into that pipeline. In an exemplary embodiment, circuitry is provided for pipeline switching that suitably enables instructions to be switched from ID2X to AC1Y and from ID2Y to AC1X, as certain instructions (e.g., change of flow, floating point, exclusive or other like instructions) may only be issued in one of the two pipelines.

"Exclusive instructions," as the phrase is used herein, include any instructions that may fault within the EX pipeline stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may suitably use the resources of both execution pipelines, exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stack pointer ("ESP") contains the actual stack pointer (instead of simply a copy thereof) when control of the stack pointer is allocated to AC1. If an instruction requires one or more address calculations, AC1 is operative to wait until the required data of the logical registers are valid before accessing those registers. During AC2, operands are obtained by accessing register file 24, and unified cache 55, with the physical address. The physical address therefore is preferably either the linear address, or if address translation is enabled, a translated address generated by ATU 50.

Exemplary ATU 50 is operative to generate translated addresses, preferably using a suitable translation look-aside buffer ("TLB") or the like, from the linear address using information from page tables in memory and local work space control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are suitably performed in AC2.

Instructions within a given instruction code stream are preferably kept in order until it is determined that out-of-order execution of the same will not cause an exception. This determination may suitably be made during or before AC2, although floating point and certain exclusive instructions may suitably cause exceptions during execution. Instructions are passed from AC2 to EX (floating point instructions are passed to FPU 70). Instructions spend a variable number of clock cycles in EX as many of the same may execute out of order. Integer instructions may cause exceptions in EX, they are therefore designated as exclusive and issued alone into both execution pipelines, thereby ensuring that exceptions are handled in order.

Exemplary execution stages EX X and EX Y suitably perform the operations defined by a given instruction using one or more of adder, logic, shifter, etc. functional units. The EX X execution stage may also include multiplication and division hardware.

Exemplary write back stage ("WB") updates register file 24, condition codes, as well as other parts of an suitable associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in Ser. No. 08/138,654, entitled "Control of Data for Speculative Execution and Exception Handling in a Processor with Write Buffer;" Ser. No. 08/138,783, entitled "Branch Processing Unit;" Ser. No. 08/138,781, entitled "Speculative Execution in a Pipelined Processor" and Ser. No. 08/138,855, entitled "Microprocessor Having Single Clock Instruction Decode Architecture", all of which are assigned to the assignee of the present invention and incorporated herein by reference for all purposes.

Figure 2:
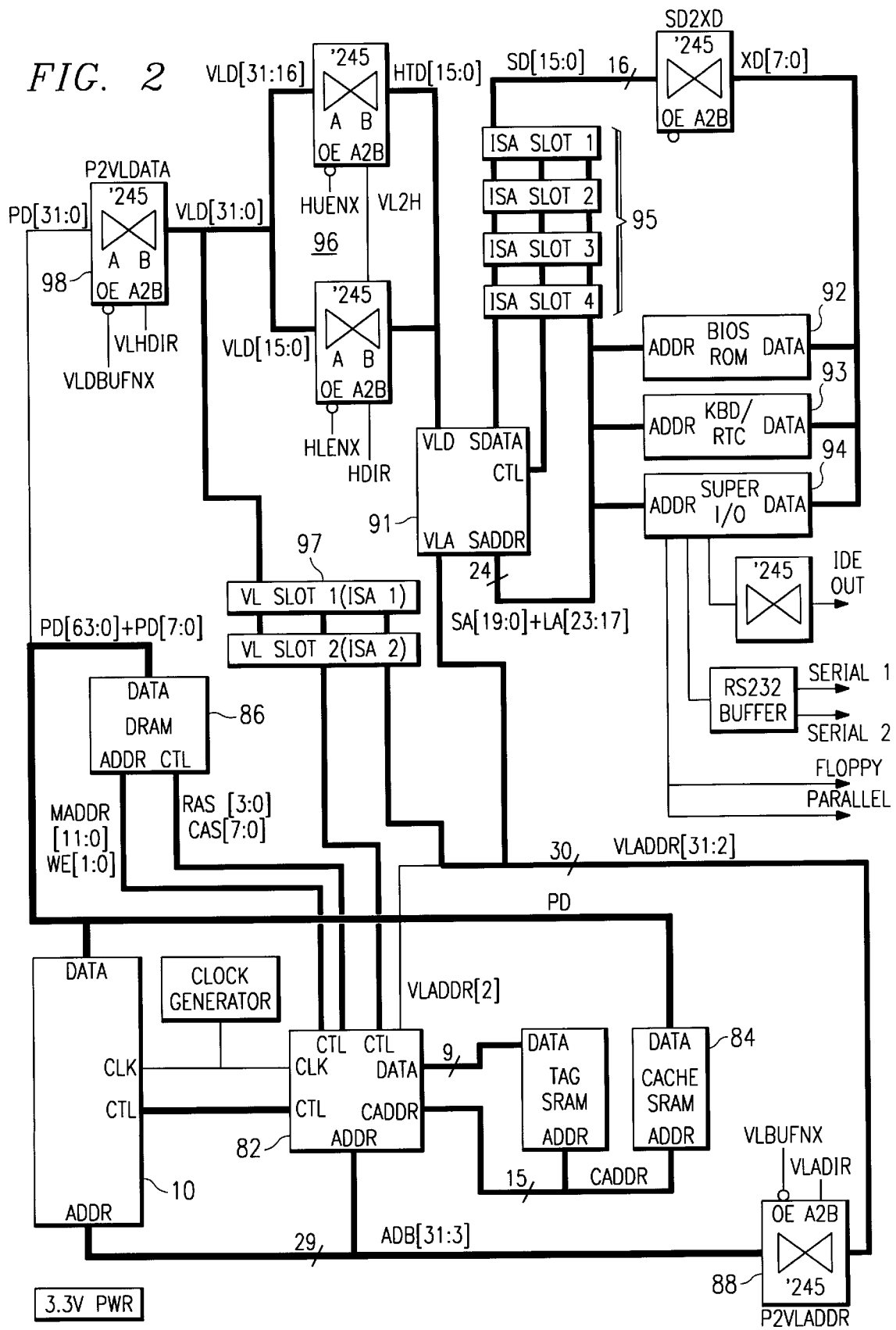
FIG. 2 illustrates a block diagram of an exemplary processor system.

Turning to FIG. 2, illustrated is an exemplary processor system design, in the form of a motherboard, that advantageously uses exemplary processor 10 of FIGS. 1a and 1b in cooperation with a single chip memory/bus controller 82. Controller 82 provides an interface between processor 10 and an external memory subsystem controlling data movement over DBS, the 64-bit processor data bus. The external memory subsystem includes level two cache 84 and main memory 86. In accordance with the illustrated embodiment, the data path may suitably be external to controller 82 thereby reducing its pin count and cost.

Controller 82 preferably interfaces with ADB, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may suitable interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97, and through a bidirectional isolation buffer 98 to the low double word of PD.

Figure 3:
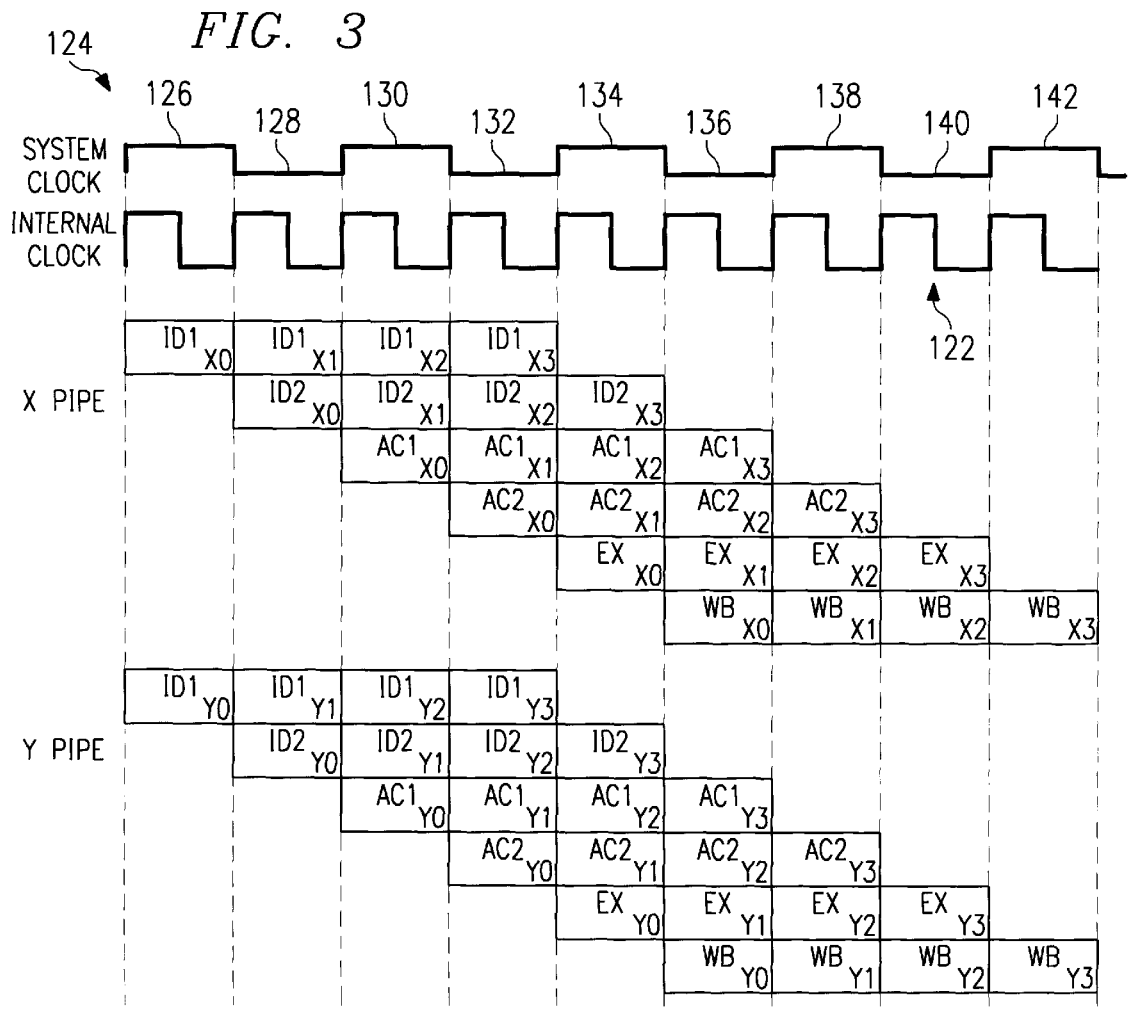
FIG. 3 illustrates an exemplary timing diagram demonstrating the flow of instructions through a pipeline unit in accordance with the exemplary processor of FIGS. 1 through 2.

Turning to FIG. 3, illustrated is an exemplary timing diagram demonstrating the flow of instructions through a pipeline in accordance with processor 10 of FIGS. 1a, 1b and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and Y0 being in ID2Y) and instructions X1 and Y1 are in the ID1 stage. During internal clock cycle 130, instructions X2 and Y2 are in the ID1 stage, instructions X1 and Y1 are in the ID2 stage (X1 being in D2X and Y1 being in ID2Y) and instructions X0 and Y0 are in the AC1 stage (X0 being in AC1X and Y0 being in AC1Y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may suitably require additional clock cycles for completion, thereby changing instruction flow through the other pipeline stages. Further, instruction flow through one pipeline may suitably depend upon the flow of other instructions in the same or the other pipeline.

Figure 4:
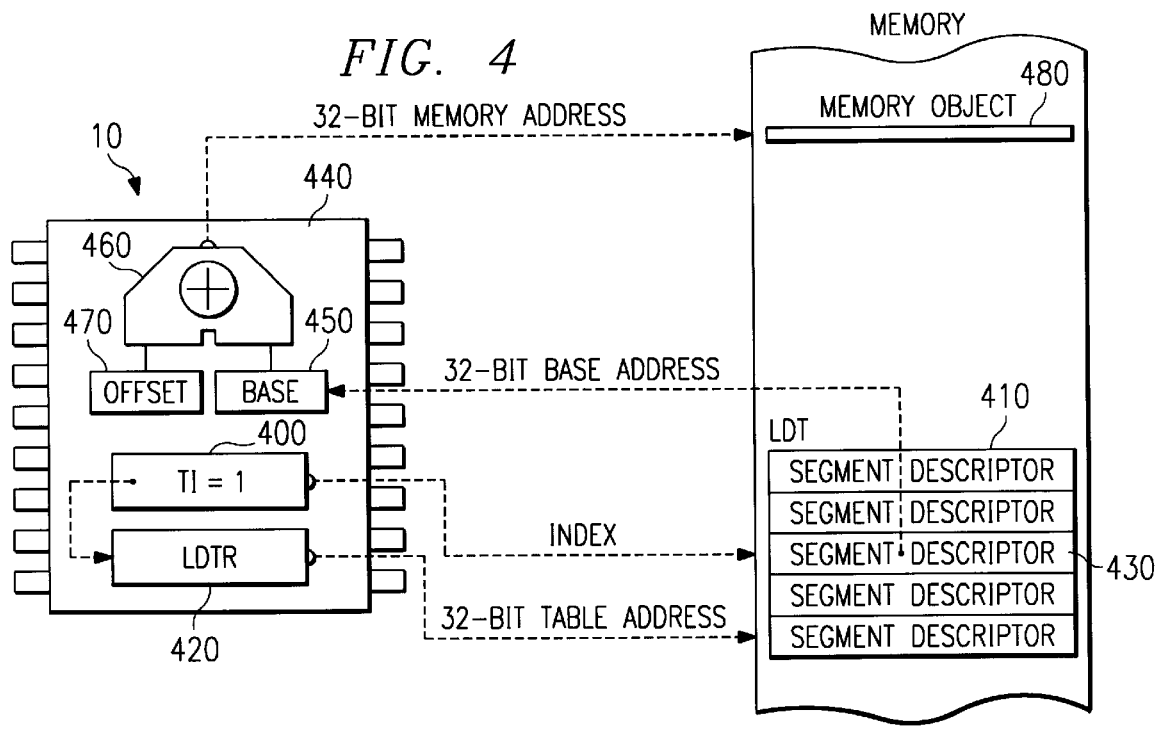
FIG. 4 illustrates a block diagram of the manner in which protected mode segment addressing is accomplished in an x86 architecture.

Turning now to FIG. 4, illustrated is a block diagram of the manner in which protected mode segment addressing is accomplished in an x86 architecture, such as in processor 10 of FIGS. 1a, 1b, 2 and 3. A selector register 400 is 16 bits in length. The two least significant bits indicate a requested privilege level ("RPL") from which a program may access a segment. The RPL provides an access check for protected mode. The third least significant bit is commonly referred to as the table indicator ("TI") bit. The TI bit indicates whether a global descriptor table ("GDT"), TI=0, or a local descriptor table ("LDT" 410), TI=1, is to be used to determine the location of a particular segment in memory. The remaining bits are commonly referred to as an index, used by processor 10 as an offset to index into one of the GDT or LDT 410. The index may suitably be used to select one of 8,192 ($2^{13}$) segment descriptors within one of the GDT or LDT 410. This is preferably accomplished by multiplying the index by eight (the number of bytes in an x86-based segment descriptor) and adding the result to the base address of the descriptor table (read from one of a global descriptor table register ("GDTR") or a local descriptor table register ("LDTR") 420).

"Segment descriptor," as the phrase is used herein, refers to a suitably-arranged data structure that provides processor 10 with the size and location of a particular segment, as well as control and status information. Segment descriptors are generally created by one of a compiler, a linker, a loader, an operating system or the like, but typically not an application program. In x86-based protected mode, each of the GDT and LDT 410 is configured as an array of segment descriptors. One GDT is provided for all tasks. There may, or may not, be a separate LDT 410 for each task being run. The GDT and each of the LDTs 410 may suitably be variable in length and contain up to 8,192 segment descriptors.

Processor 10 locates either the GDT or one of the LDTs 410 by respectively using one of the GDTR or the LDTR 420, each of which may suitably hold a 32-bit base address for, and a 16-bit limit value for the size of, its associated descriptor table. As with segments, the limit value is added to the base address to get the address of the last valid byte. A limit value of zero results in exactly one valid byte. The LGDT and SGDT instructions write and read the GDTR, while the LLDT and SLDT instructions write and read the segment selector in the LDTR 420.

In accordance with x86-based architecture, processor 10 preferably includes six segment registers (CS, DS, ES, FS, GS and SS), each of which may suitably include a segment selector that points to a segment descriptor. If a program currently executing in processor 10 is associated with more segments than the six whose segment selectors occupy the segment registers, then the program may use known forms of the "MOV" or "POP" instructions, for example, to change the contents of one or more of these segment registers when it needs to access a new segment. To access a segment descriptor, processor 10 suitably adds the index of the selector register 400 to the base address in LDTR 410 to thereby address LDT 420 and a segment descriptor 430 therein. Processor 10 employs segment descriptor 430, eight bytes long, to determine a base address 450 and a limit (not shown) of a particular segment in memory. Processor 10 stores the segment descriptor 430 retrieved from the LDT 420 in a descriptor register 440. It is with the descriptor register 440 that the present invention operates to determine whether an access bit within the segment descriptor 430 stored therein is set (indicating that the segment associated with the segment descriptor 430 has been previously accessed). If the access bit is already set, the present invention does not come into play. If not, the present invention provides a novel way to set the access bit.

After retrieving the segment descriptor 430, processor 10, using conventional address adder circuitry 460, adds base address 450 and an associated offset 470 to generate the linear address of an object 480 within memory. Processor 10 may suitably be further operative to check that the generated address is within the limit of the segment (i.e., expand-down segments reverse the meaning of the limit check), if it is not, processor 10 preferably issues an exception, such as a "general protection fault". In alternate advantageous embodiments, processor 10 may suitably issue other exceptions, such as "stack" and "invalid task state segment" exceptions, for example.

Those of ordinary skill in the art know that although only a single descriptor table is illustrated, conventional implementations suitably include a plurality of descriptor tables. Further, although a single conventional memory is illustrated, conventional implementations may suitably include a plurality of associated conventional memory storage devices. Still further, the conventional memory can be main or system memory or an associated cache memory or registers. "Associated," as the term is used herein, may suitably be analogized with "associated with."

Turning now to FIG. 5, illustrated is a block diagram of the descriptor register discussed in FIG. 4 containing an exemplary segment descriptor 430 of FIG. 4 having a segment access indicator 510 according to x86-based architectures. It should be understood that the form in which the segment descriptor 430 is stored in the descriptor register 440 is immaterial, as long as the segment access indicator 510 is included therein. Whenever processor 10 accesses a segment in memory, processor 10 is to ensure, for the benefit of any operating system that may make use of it, that segment access indicator 510 of segment descriptor 430 is set. Setting segment access indicator 510 suitably enables an operating system executing in processor 10 to identify which segments were recently accessed. This information may suitably be used to implement conventional segment swapping. The swap routine of the operating system resets set segment access indicators of previously-loaded segments. The next access to a segment then sets the associated segment access indicator. Through a periodic evaluation of the set and reset segment access indicators, processor 10 may suitably determine which segments are frequently, and which segments are infrequently, addressed. Preferred swap routines give preference to LRU segments, storing the same externally to minimize the number of swaps.

Turning now to FIG. 6, illustrated is a block diagram of an exemplary circuit, generally designated 600, for setting a segment access indicator in the exemplary processor 10 of FIGS. 1a, 1b, 2 and 3. Status checking circuitry 610, associated with EX stages 23X, 23Y of FIG. 1a, examines segment descriptor 430 for a status of bits in segment descriptor 430. In particular, status checking circuitry 600 checks the status of the segment access indicator therein. If the segment access indicator is in a zero state, indicating that the segment has not previously been accessed, the status checking circuitry 610 generates an exception (that may advantageously be an INT 3 software-type exception) by means of exception generating circuitry 620, also associated with EX stages 23X, 23Y of FIG. 1a.

Exception handling circuitry 630, invoked by processor 10 in response to generation of the exception, flushes the pipeline of instructions following a segment load instruction that caused the loading of segment descriptor 430. Next, exception handling circuitry 630 calls a microcoded routine stored in microROM (part of the microcontrol unit 26 of FIG. 1a) that sets the segment access indicator to a one state, loads the descriptor into the descriptor cache (27 of FIG. 1a) and loads an address pointer of said processor with an address corresponding to a specified location within said segment. More specifically, the address corresponds to the instruction following the segment load instruction that caused the loading of the segment descriptor 430. At this point, the exception is considered handled, the segment access indicator is set and execution is allowed to return to normal.

Figure 7:
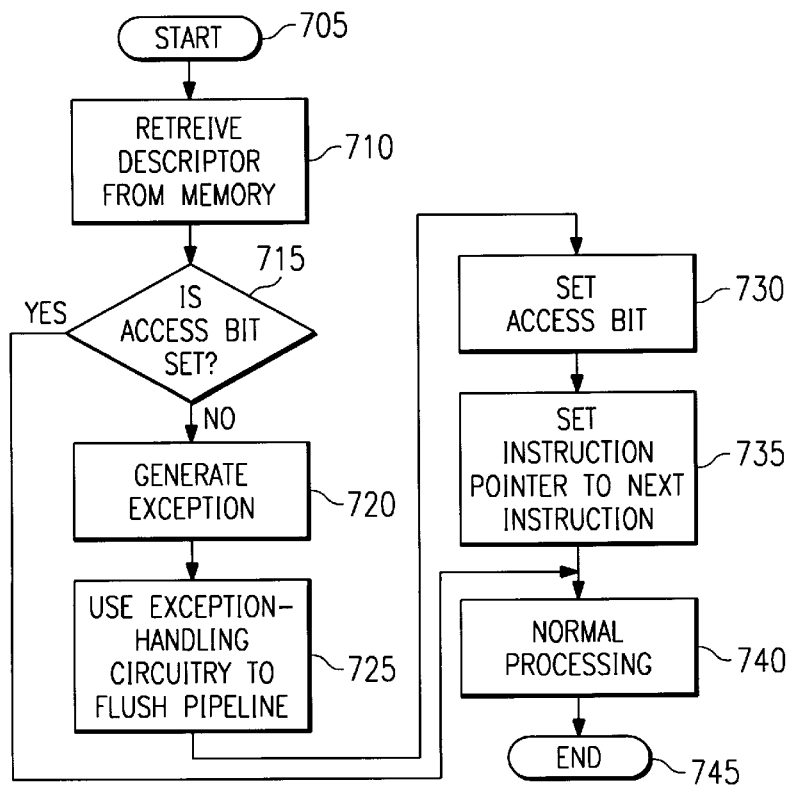
FIG. 7 illustrates a flow diagram of an exemplary method of operation of the exemplary circuit of FIG. 6 for setting the segment access indicator of FIG. 5 in the exemplary processor of FIGS. 1a, 1b, 2 and 3.

Turning now to FIG. 7, illustrated is a flow diagram of an exemplary method of operation of circuit 600 of FIG. 6 for setting segment access indicator 510 of FIG. 5 in processor 10 of FIGS. 1a, 1b, 2 and 3 according to the present invention.

Again, according to conventional x86-based architectures, a typical execution sequence of EXI should issue microcode control sequences into the decode (e.g., ID 21) and address calculation/operand access (e.g., AC Control 25, ACX 22X, ACY 22Y) processing stages of the pipeline to facilitate certain operations. One such operation suitably sets segment access indicator 910 associated with execution of EM during the execution stage. Unfortunately in highly-optimized architectures, EXI has long since released control of the decode and address calculation/operand access processing stages of the pipeline, which currently are collectively servicing a other instructions.

Accordingly, the exemplary method of FIG. 7 begins with a start step 705 wherein a segment load instruction is encountered in the stream of instructions being executed by processor 10. In response, processor 10 retrieves a descriptor from the applicable descriptor table in a step 710. Then, the access bit within the decriptor is tested to determine whether it is set or not in a decisional step 715. If the access bit is already set, the present invention does not come into play, and normal processing of the segment load instruction continues (YES branch of decisional step 715, leading to a normal processing step 740).

If the access bit has not yet been set (NO branch of decisional step 715), processor 10 generates an exception (in a step 720), thereby effectively enabling EXI to seize or regain control of the microcode control sequences of the previous processing stages and beginning the process of setting the access bit. In response to the exception, exception-handling circuitry within the processor 10 flushes the applicable pipeline of instructions (in a step 725) and calls a microcoded routine to handle the remainder of the exception by instructing the microsequencer of processor 10 to go, or vector, to a particular point of entry in the microROM. Those of ordinary skill in the art will recognize that the principles of present invention, although illustrated in the context of microROM instructions, may suitably be embodied in hardware or higher-level software instructions.

The microcoded routine sets the access bit (in a step 730) and most preferably sets an address pointer of processor 10 to an address corresponding to the instruction following the segment load instruction (in a step 735). This may suitably be accomplished by loading an conventional address pointer of processor 10 with an address corresponding to a specified location within the segment. In one embodiment, processor 10 may suitably reload the decode and address calculation/ operand access processing stages from the segment as a function of a specified location. Preferably, once the address pointer is loaded, execution of instructions resumes. Accordingly, instructions are fetched from system memory as a function of the specified location (the value of the address pointer) in step 740. Finally, processing ends in an end step 745.

More generally, the present invention, although applicable in the above-described embodiment, broadly provides a way to mark segments of memory as having been accessed. Pipelined processor 10 may suitably be operative to address segments of memory associated therewith, and particularly, to set segment access indicator 910 associated with a segment of memory accessed by processor 10.

The illustrated embodiment employs processor 10's already-existing exception-handling system to achieve some of the steps necessary to set segment access indicator 510. Processor 10's existing exception-handling system may suitably automatically flush the pipeline of instructions behind the EM in the EX processing stage upon receiving an exception and before invoking more specific circuitry to handle the exception.

From the above, it is apparent that the present invention provides, in a pipelined processor having at least one execution pipeline for executing instructions, the execution pipeline including ID (decode), AC (address calculation), and EX (execution) processing stages, the processor capable of addressing segments of system memory coupled thereto, a circuit for, and method of, setting a segment access indicator associated with a segment of the system memory being accessed by the processor. The circuit includes: (a) exception generating circuitry to generate an exception when the segment access indicator requires setting and (b) exception handling circuitry, invoked by the processor in response to generation of the exception, to flush the execution pipeline of instructions in the ID, AC and EX stages, set the segment access indicator and load an address pointer of the processor with an address corresponding to a specified location within the segment.

Although the present invention and its advantages have been described in detail, those skilled in the art should understand that they can make various changes, substitutions and alterations herein without departing from the split and scope of the invention in its broadest form.

What is claimed is:

1. In a pipelined processor having at least one execution pipeline with at least an ID processing stage for decoding instructions, and AC processing stage for calculating memory addresses for memory reference instructions including segment descriptor load instructions, and an EX processing stage for executing instructions including segment descriptor load instructions, where the processor executes a segment descriptor load instruction to load a segment descriptor from a system memory external to the processor, the segment descriptor including information describing a memory segment in the system memory including a segment access indicator that when set indicates that the memory segment has been accessed, a circuit to control setting the segment access indicator in response to execution of a segment descriptor load instruction in the EX processing stage, comprising:

(a) instruction decode and issue circuitry in the ID processing stage that decodes a segment descriptor load instruction and issues it to the AC processing stage without checking the status of the segment descriptor indicator;

(b) the AC processing stage being responsive to the segment descriptor load instruction to calculate a memory address used to load the segment descriptor, and then issue the segment descriptor load instruction to the EX processing stage;

(c) exception generating circuitry that checks the status of the segment access indicator when the segment descriptor load instruction is in the EX processing stage, and generates an exception when said segment access indicator is not set; and (d) exception handling circuitry, invoked by said processor in response to generation of said exception, to (i) flush said execution pipeline of instructions following the segment load instruction, (ii) set said segment access indicator and (iii) provide an address pointer for an address corresponding to a specified location within said memory segment.

2. The circuit as recited in claim 1 wherein said processor reloads instructions following said segment load instruction into at least said ID and AC stages from said segment as a function of said specified location.

3. The circuit as recited in claim 1 wherein said exception handling circuitry is embodied in a sequence of microcode instructions.

4. In a pipelined processor having at least one execution pipeline with at least an ID processing stage for decoding instructions, and AC processing stage for calculating memory addresses for memory reference instructions including segment descriptor load instructions, and an EX processing stage for executing instructions including segment descriptor load instructions, where the processor executes a segment descriptor load instruction to load a segment descriptor from a system memory external to the processor, the segment descriptor including information describing a memory segment in the system memory including a segment access indicator that when set indicates that the memory segment has been accessed, a circuit to control setting the segment access indicator in response to execution of a segment descriptor load instruction in the EX processing stage, comprising:

(a) instruction decode and issue means in the ID processing stage for decoding a segment descriptor load instruction and issuing it to the AC processing stage without checking the status of the segment descriptor indicator;

(b) the AC processing stage being responsive to the segment descriptor load instruction for calculating a memory address used to load the segment descriptor, and then issuing the segment descriptor load instruction to the EX processing stage;

(c) exception generating means for checking the status of the segment access indicator when the segment descriptor load instruction is in the EX processing stage, and generating an exception when said segment access indicator is not set; and (d) exception handling means, invoked by said processor in response to generation of said exception, for (i) flushing said execution pipeline of instructions following the segment load instruction, (ii) setting said segment access indicator and (iii) providing an address pointer for an address corresponding to a specified location within said memory segment.

5. The circuit as recited in claim 4 further comprising means for reloading instructions following said segment load instruction into at least said ID and AC stages from said segment as a function of said specified location.

6. The circuit as recited in claim 4 wherein said exception handling means is embodied in a sequence of microcode instruction means.

7. In a pipelined processor having at least one execution pipeline with at least an ID processing stage for decoding instructions, and AC processing stage for calculating memory addresses for memory reference instructions including segment descriptor load instructions, and an EX processing stage for executing instructions including segment descriptor load instructions, where the processor executes a segment descriptor load instruction to load a segment descriptor from a system memory external to the processor, the segment descriptor including information describing a memory segment in the system memory including a segment access indicator that when set indicates that the memory segment has been accessed, a method of setting the segment access indicator in response to execution of a segment descriptor load instruction in the EX processing stage, comprising the steps of:

(a) decoding in the ID processing stage a segment descriptor load instruction and issuing it to the AC processing stage without checking the status of the segment descriptor indicator;

(b) calculating in the AC processing stage, in response to the segment descriptor load instruction, a memory address used to load the segment descriptor, and then issuing the segment descriptor load instruction to the EX processing stage;

(c) checking the status of the segment access indicator when the segment descriptor load instruction is in the EX processing stage, and generating an exception when said segment access indicator is not set;

(d) flushing said execution pipeline of instructions following the segment load instruction;

(e) setting said segment access indicator; and (f) providing an address pointer for an address corresponding to a specified location within said memory segment.

8. The method as recited in claim 7 further comprising the step of reloading instructions following said segment load instruction into at least said ID and AC stages from said segment as a function of said specified location.

9. The method as recited in claim 7 wherein said step of setting is performed by executing a sequence of microcode instructions.

10. A computer system, comprising:

(a) a pipelined processor having at least one execution pipeline with at least an ID processing stage for decoding instructions, and AC processing stage for calculating memory addresses for memory reference instructions including segment descriptor load instructions, and an EX processing stage for executing instructions including segment descriptor load instructions;

(b) a system memory external to the processor that includes at least one memory segment that is described by a segment descriptor stored in the system memory, the segment descriptor including a segment access indicator that when set indicates that the memory segment has been accessed;

(c) said processor including instruction fetch logic that fetches instructions from said system memory, including a segment descriptor load instruction to load the segment descriptor from the system memory; and (d) said processor further including a circuit to control setting the segment access indicator in response to execution of a segment descriptor load instruction in the EX processing stage, said circuit comprising:

(i) exception generating circuitry that checks the status of the segment access indicator when the segment descriptor load instruction is in the EX processing stage, and generates an exception when said segment access indicator is not set; and (ii) exception handling circuitry, invoked by said processor in response to generation of said exception, to (i) flush said execution pipeline of instructions following the segment load instruction, (ii) set said segment access indicator and (iii) provide an address pointer for an address corresponding to a specified location within said memory segment.

11. The system as recited in claim 10 wherein said processor reloads instructions following said segment load instruction into at least said ID and AC stages from said segment as a function of said specified location.

12. The system as recited in claim 10 wherein said exception handling circuitry is embodied in a sequence of microcode instructions.

* * * * *